United States Patent [19]

Maubray

[11] Patent Number: 5,042,106
[45] Date of Patent: Aug. 27, 1991

[54] WINDSHIELD WIPER DEFLECTOR WITH AIR FLOW CONTROL

[75] Inventor: Daniel Maubray, Issy-Les-Moulineaux, France

[73] Assignee: Valeo Systemes d'Essuyage, Montigny-Le-Brettoneux, France

[21] Appl. No.: 537,933

[22] Filed: Jun. 13, 1990

[30] Foreign Application Priority Data

Jun. 15, 1989 [FR] France ............................. 89 07968

[51] Int. Cl.$^5$ .............................................. B60S 1/04
[52] U.S. Cl. ................................. 15/250.2; 15/250.42
[58] Field of Search ........... 15/250.42, 250.20, 250.35, 15/250.36

[56] References Cited

U.S. PATENT DOCUMENTS 3,350,738  11/1967  Anderson ......................... 15/250.42
4,561,143  12/1985  Beneteau .......................... 15/250.42

FOREIGN PATENT DOCUMENTS 0287464  10/1988  European Pat. Off. .
2031803   1/1971   Fed. Rep. of Germany ... 15/250.42
1228119   3/1960   France ............................. 15/250.36
2556297   6/1985   France .
2621288   4/1989   France .
1040936   9/1966   United Kingdom ............. 15/250.42
2190834  12/1987   United Kingdom .

Primary Examiner—Edward L. Roberts
Assistant Examiner—Gary K. Graham
Attorney, Agent, or Firm—Dennison, Meserole, Pollack & Scheiner

[57] ABSTRACT

An air flow deflector for a windshield wiper includes a profiled portion joined to a means for attaching the deflector on a wiper blade or on a wiper arm. The deflector includes surfaces which obstruct the air flow. In addition, it includes guide means for the air flow. The invention is particularly applicable to windshield wiper systems for automotive vehicles.

8 Claims, 2 Drawing Sheets

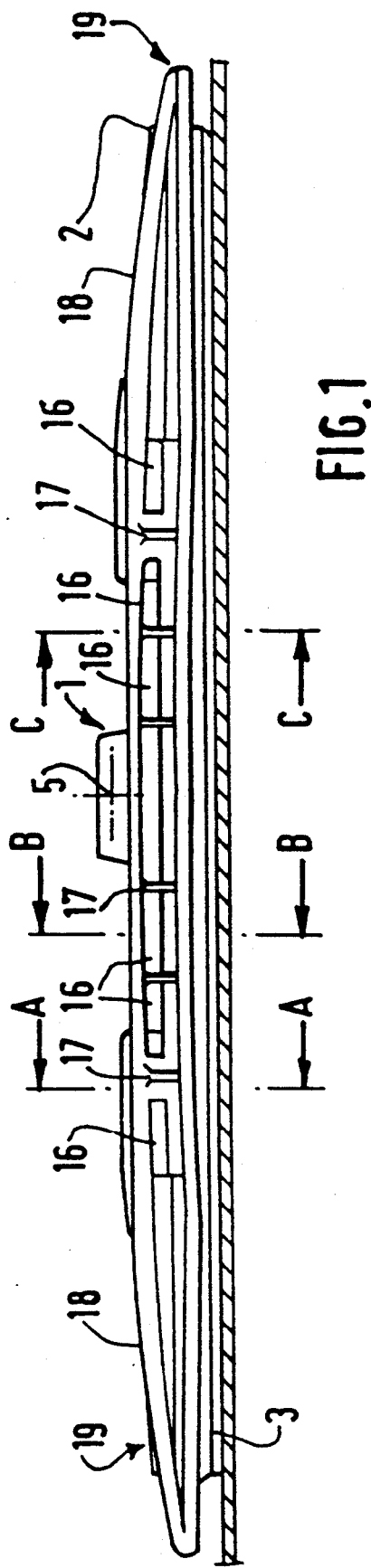
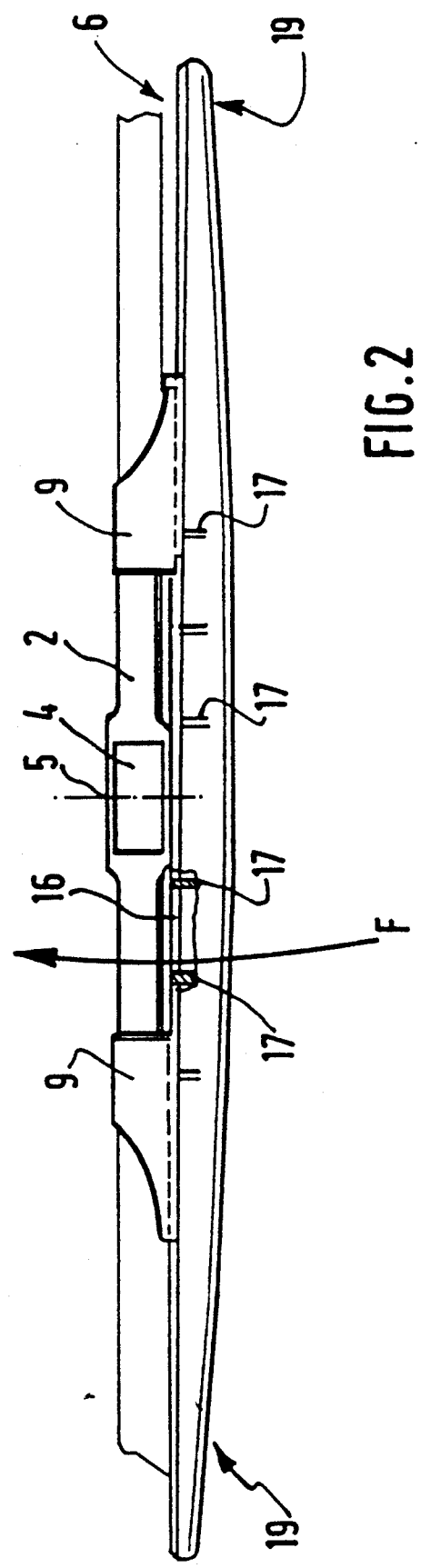

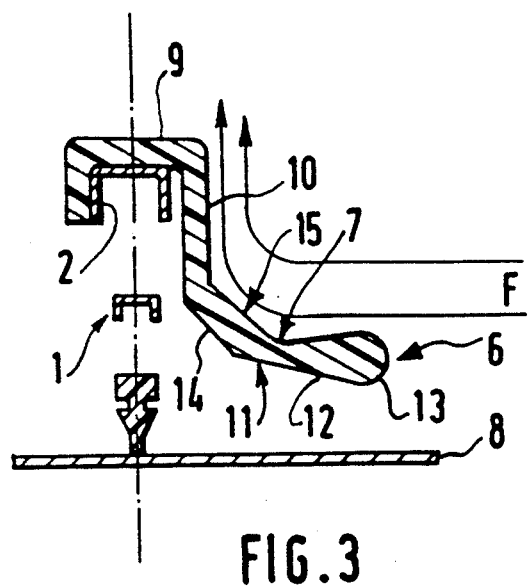
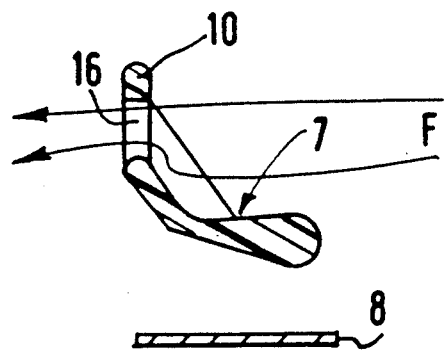
FIG.3  FIG.4
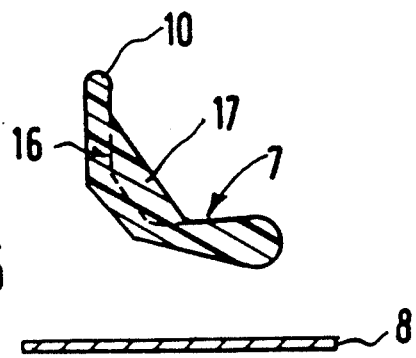
FIG.5
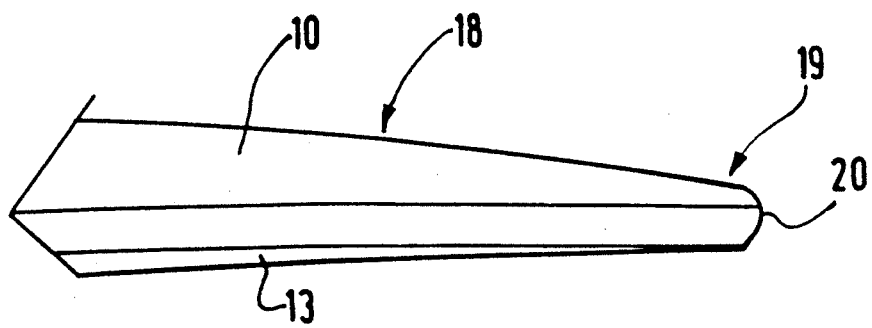
FIG.6

WINDSHIELD WIPER DEFLECTOR WITH AIR FLOW CONTROL

FIELD OF THE INVENTION

The present invention relates to an air flow deflector, in particular for a windshield wiper, for example in an automotive vehicle.

BACKGROUND OF THE INVENTION

A deflector of the kind described in the specification of U.S. patent application Ser. No. 253,864, filed Oct. 5, 1988, and the corresponding published French patent application No. FR 2 621 288A, comprises a profiled portion having a first zone which is substantially flat and which extends backwardly from a leading edge, the said first zone being slightly inclined with respect to the mean plane of the surface to be swept, and a second zone adjacent to the first zone but inclined to the swept surface at a greater angle than the first zone. The profiled portion lies at a sufficiently small distance away from the surface to create a ground effect which produces a relatively large reduction in pressure below the deflector, that is to say in the zone lying between the swept surface and the profiled portion of the deflector, and this enables the wiper blade to be applied correctly against the swept surface.

It has been proposed to mount this type of air deflector on either the wiper blades or the wiper arms, in such a way that during the wiping operation on an inclined windshield, while the automotive vehicle is moving, wiping is facilitated during upward movement of the wiper arm. This is achieved by arranging that the air flow, impinging on the deflector, urges the windshield wiper blade in the same direction as does the drive motor of the wiper, while during downward movement of the arm, the speed of descent of the wiper blade remains substantially equal to the speed of its upward movement.

In order to achieve this, there must be no perturbation or turbulence, such as a possible modification of the pressure drop underneath the deflector, which would hamper good functioning of the deflector.

DISCUSSION OF THE INVENTION

An object of the present invention is to provide a deflector which maintains its good features whatever its movement in the air flow passing along it.

In accordance with the invention, an air flow deflector for a windshield wiper blade, in particular for an automotive vehicle, comprising a profiled portion and attachment means for attaching the deflector to a windshield wiper arm or a windshield wiper blade, is characterised in that the air deflector has means for guiding the air flow.

These air flow guidance means enable the deflector to operate well regardless of its movement during wiping.

In accordance with another feature of the invention, these guidance means comprise at least one opening associated with a rib.

According to a further feature of the invention, the said rib is arranged orthogonally to the longitudinal direction of the deflector.

According to yet another feature of the invention, the rib is carried by the profiled portion of the deflector and constitutes a weir for diverting the air flow. According to a still further feature of the invention, the said opening is formed in connecting means joining the profiled portion with the attachment means of the deflector.

These arrangements produce, firstly, a reduction in the possibility of the deflector being diverted out of its correct path in the air flow, and secondly, due to the openings formed in the connecting means, drag is able to be reduced, that is to say there is a reduction in the force opposing the advance of the deflector in the air flow.

The other features and advantages of the invention will appear more clearly from the description which follows, which is given by way of example only and with reference to the accompanying drawings.

BRIEF DESCRIPTION OF THE DRAWINGS

FIG. 1 is a front view of one deflector in accordance with the invention, carried by a windshield wiper blade.

FIG. 2 is a view looking down on the deflector and blade shown in FIG. 1.

FIG. 3 is a view in partial cross section of the deflector, taken on the line AA in FIG. 1.

FIG. 4 is a view in partial cross section taken on the line BB in FIG. 1.

FIG. 5 is a view in partial cross section taken on the line CC in FIG. 1.

FIG. 6 is a detail on a larger scale, showing part of the same deflector in accordance with the invention.

DESCRIPTION OF A PREFERRED EMBODIMENT OF THE INVENTION

Reference is first made to FIGS. 1 to 3, in which a windshield wiper blade 1 is shown, comprising generally an armature 2 for supporting a wiper strip 3. The armature 2 is generally profiled so as to have an inverted U shaped transverse cross section, with an opening 4 formed in the base of the U shaped profile in the middle part of the armature. In the opening 4 a pivot spindle 5 is arranged to be engaged in a pivot pin carrying element at one end of a windshield wiper arm (not shown), so as to articulate the arm to the wiper blade 1.

The blade 1 is equipped with an air deflector 6, which is in this particular example carried by the blade itself, but which could be carried by the wiper arm. The type of air deflector which is featured in the remainder of this description is described more precisely in the above mentioned patent specification, and details of it will only be mentioned here in general terms.

With reference more particularly to FIG. 3, the deflector 6 has a profiled portion 7, which is spaced from the surface 8 to be swept, together with attachment means 9 for attachment of the deflector 6 to the armature 2 of the wiper blade 1, and a connecting web 10 which joins the profiled portion 7 to the attachment means 9.

The profiled portion 7 of the deflector is substantially convex in shape, being convex towards the swept surface 8, and comprises on its inner surface 11 a first zone 12 which extends from an outer edge 13 towards the blade 1. This first zone or surface portion 12, which is generally flat, is inclined with respect to the swept surface 8. The inner surface 11 also includes a second surface portion 14 which follows the first surface portion 12 and makes a larger angle with the swept surface 8 than that made by the surface portion 12. The outer surface 15 of the profiled portion 7 is in the form of a concave dihedral or channel, such that the thickness of the profiled portion 7 diminishes progressively from the edge 13 towards the blade 1. As has been mentioned above, the profiled portion 7 is joined to the attachment means 9 through a web 10 defining a connecting means, this web extending along the deflector and in a direction which is substantially orthogonal to the swept surface 8.

As is best seen in FIG. 3, an air flow F, in a direction substantially orthogonal to the longitudinal direction of the deflector 6, is set up during movement of the vehicle on which the windshield wiper blade is mounted, and more particularly when the vehicle is travelling at high speed. This air flow, which is substantially parallel to the swept surface 8, runs along the outer surface 15 of the profiled portion 7, and continues along the web 10 which joins the profiled portion 7 to the attachment means 9. The web 10 thus offers a resistance to the air flow and disperses the latter along the deflector, and it can happen that eddies of air, detrimental to the good operation of the assembly, thereby become detached. Accordingly, the air deflector 6 carries guide means for the air flow F.

Referring more particularly now to FIG. 4, the deflector 6 has at least one opening 16 which is adapted to allow the air flow F to pass across the deflector. This opening is formed in the connecting web 10 and is substantially rectangular, with its longer sides extending generally along the deflector 6.

As is best seen in FIG. 1, there are provided a multiplicity of these openings 16, spaced apart uniformly along the web 10 and arranged close to each other. The lengths of these openings 16 may be varied according to their position on the web.

Associated with the rectangular openings 16, a rib 17 is also provided as shown in FIG. 5. This rib is in this example situated between two successive openings 16, and serves to divert the air flow passing along the deflector 6 so as to guide it through the openings 16. The rib 7 is carried partly by the outer surface 15 of the deflector in the profiled portion 7 overlying the surface portion 12, and partly by the outer surface of the connecting web 10. In practice the rib 17 has a trapezoidal shape as seen in FIG. 5, with the longer one of its two parallel base lines extending from the outer surface of the web 10 to the outer surface 15 on the profiled portion 7. The shorter base line of the trapezium is coincident with the outer surface 15 in that part of the profiled portion having the inner surface portion 14; while the shorter, non parallel, sides of the trapezium lie respectively on the outer surface of the web 10 and on the outer surface of the profiled portion 7.

The rib 17 is arranged in such a way that laterally extending end edges of two successive openings 16 aligned with the rib are in fact the surfaces of those ribs. This is best seen by studying of FIGS. 1, 2 and 4. The rib 17, which may be trapezoidal in shape as described, or in any other suitable form, can of course have its longer parallel side joining the respective outer edges of the profiled portion 7 and web 10.

Referring again to FIG. 1, this shows a multiplicity of ribs 17 associated with the openings 16, with in this example one rib 17 situated between two openings 16. Thus, as is best seen in FIG. 2, if an air flow F is diverted from the normal, the ribs 17 act as weirs in such a way as to divert the air flow so that the latter is guided towards the opening 16, so as to pass through the latter.

The drag effects which tend to oppose advance of the deflector in the air flow is thus enabled to be limited. In addition, the ribs 17 act as stiffening elements between the web 10 and the profiled portion 7.

Referring now to FIG. 6, the deflector 6 includes a further air guidance means, which may optionally be associated with the other features described above and which comprises a curved profile 18 arranged at the extreme end portions of the deflector 6. This curved profile consists in a reduction in the depth of the web 10 up to the end 20 of the deflector. This reduction in depth takes place progressively, from for example the junction with the attachment means 9, and is continued until the depth of the web 10 is substantially zero in the region of the junction with the surface portion 14 of the profiled portion 7. The air flow F thus passes along this curved profile, which therefore allows the flow to be able to continue its course without causing any turbulence on the deflector.

The present invention is not limited to the embodiments described, but embraces any variants. In particular, the thickness of the ribs 17 may be made variable, for example from the profiled portion 7 up to the web 10.

What is claimed is:

1. An air flow deflector for a windshield wiper comprising a windshield wiper arm and a wiper blade carried by said arm, wherein the deflector comprises a profiled portion connected to a web portion with attachment means joined to the web portion for attaching the deflector to said wiper arm, said profiled portion extending coextensively with a windshield when mounted on said arm and with said web portion extending upwardly away from said windshield, the deflector further including guide means for the air flow, said guide means comprising a plurality of coplanar openings in said web portion and a plurality of integral ribs between said openings, said ribs projecting from said web portion out of the plane of said openings and joining said profiled portion whereby said ribs act as baffles to conduct air flow into said openings.

2. A deflector according to claim 1 wherein said deflector has a longitudinal direction and said ribs are disposed orthogonally to the longitudinal direction of the deflector.

3. A deflector according to claim 1, wherein each of said opening is separated by a rib.

4. The deflector according to claim 1 wherein said openings are rectangular in shape.

5. The deflector according to claim 1 wherein said ribs are trapezoidal in shape.

6. The deflector according to claim 5 wherein the longer parallel side of said trapezoidal ribs faces the air flow.

7. The deflector according to claim 1 wherein said ribs additionally serve to strengthen the connection between said web portion and said profiled portion.

8. The deflector according to claim 1 wherein extreme end portions of said deflector are gradually tapered by reducing the extent of said web and profile portions.

* * * * *